(12) United States Patent
Sharma et al.

(10) Patent No.: US 10,554,489 B2
(45) Date of Patent: *Feb. 4, 2020

(54) DISCOVERY PROTOCOL FOR ENABLING AUTOMATIC BOOTSTRAP AND COMMUNICATION WITH A SERVICE APPLIANCE CONNECTED TO A NETWORK SWITCH

(71) Applicant: Cisco Technology, Inc., San Jose, CA (US)

(72) Inventors: Samar Sharma, San Jose, CA (US); Mitali Parthasarathy, Sunnyvale, CA (US); Avni Baveja, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,462

(22) Filed: Jun. 18, 2018

(65) Prior Publication Data

US 2019/0020537 A1 Jan. 17, 2019

Related U.S. Application Data

(63) Continuation of application No. 14/492,008, filed on Sep. 20, 2014, now Pat. No. 10,003,495.

(51) Int. Cl.
*G06F 15/177* (2006.01)
*H04L 12/24* (2006.01)
*H04L 29/08* (2006.01)

(52) U.S. Cl.
CPC .......... *H04L 41/0806* (2013.01); *H04L 67/34* (2013.01)

(58) Field of Classification Search
CPC .......................... H04L 67/34; H04L 41/0806
See application file for complete search history.

(56) References Cited

U.S. PATENT DOCUMENTS 7,203,740 B1 * 4/2007 Putzolu .................. H04L 29/06
709/217
7,240,364 B1 * 7/2007 Branscomb ....... H04L 29/12113
726/5

(Continued)

OTHER PUBLICATIONS

Brocade Communications Systems, Inc., "Chapter 5—Configuring Virtual LANs (VLANs)," Jun. 2009, 38 pages.

(Continued)

*Primary Examiner* — Dhairya A Patel
(74) *Attorney, Agent, or Firm* — Polsinelli PC

(57) ABSTRACT

An example method is provided and includes configuring a service on a network element; associating a directly connected port with the service to create a port channel between the network element and a directly connected service appliance, the port channel comprising a plurality of member ports; performing an auto-discovery process for each of the member ports; and, upon successful completion of the performing, indicating on the network element that the service appliance is operational. In certain embodiments, the network element includes an intelligent service card manager module ("ISCM") that forms part of a Remote Integrated Service Engine ("RISE") element with a corresponding intelligent service card client module ("ISCC") installed on the service appliance. The method may further include, upon unsuccessful completion of the auto-discovery process, repeating the auto-discovery process.

20 Claims, 12 Drawing Sheets

(56) References Cited

U.S. PATENT DOCUMENTS

| | | | | |
|---|---|---|---|---|
| 7,302,487 B2* | 11/2007 | Ylonen | H04L 63/0272 | 709/220 |
| 8,775,577 B1* | 7/2014 | Alford | H04L 67/34 | 709/221 |
| 9,178,912 B2 | 11/2015 | Sharma et al. | | |
| 9,246,702 B1* | 1/2016 | Sharma | H04L 12/2896 | |
| 10,270,658 B2 | 4/2019 | Sharma et al. | | |
| 2002/0097687 A1* | 7/2002 | Meiri | G06F 11/20 | 370/254 |
| 2003/0231660 A1* | 12/2003 | Vinnakota | G06F 9/30018 | 370/474 |
| 2005/0108331 A1* | 5/2005 | Osterman | H04L 29/06 | 709/204 |
| 2005/0198371 A1* | 9/2005 | Smith | H04L 45/02 | 709/238 |
| 2006/0077909 A1* | 4/2006 | Saleh | H04L 12/66 | 370/254 |
| 2006/0159032 A1* | 7/2006 | Ukrainetz | H04L 29/12216 | 370/254 |
| 2007/0195794 A1* | 8/2007 | Fujita | H04L 12/4633 | 370/395.53 |
| 2011/0103259 A1* | 5/2011 | Aybay | H04L 49/35 | 370/254 |
| 2011/0225207 A1* | 9/2011 | Subramanian | H04L 45/586 | 707/803 |
| 2013/0107709 A1* | 5/2013 | Campbell | H04L 49/358 | 370/235 |
| 2013/0185563 A1 | 7/2013 | Djabarov et al. | | |
| 2013/0242999 A1* | 9/2013 | Kamble | G06F 9/45558 | 370/392 |
| 2014/0025806 A1 | 1/2014 | Robitaille et al. | | |
| 2014/0092884 A1* | 4/2014 | Murphy | H04L 69/03 | 370/338 |
| 2014/0137109 A1* | 5/2014 | Sharma | H04L 49/70 | 718/1 |
| 2015/0081855 A1* | 3/2015 | Zhang | H04L 41/12 | 709/220 |
| 2016/0094394 A1* | 3/2016 | Sharma | H04L 41/0886 | 709/223 |

OTHER PUBLICATIONS

Cisco Systems, Inc. "CiscoData Center Network Architecture and Solutions Overview," Feb. 2006, 19 pages.

Cisco Systems, Inc., "Cisco—VPN Client User Guide for Windows," Release 4.6, Aug. 2004, 148 pages.

Cisco Systems, Inc., "Cisco 4710 Application Control Engine Appliance Hardware Installation Guide," Nov. 2007, 66 pages.

Cisco Systems, Inc., "Cisco Application Control Engine (ACE) Troubleshooting Guide—Understanding the ACE Module Architecture and Traffic Flow," Mar. 11, 2011, 6 pages.

Cisco Systems, Inc., "Cisco VN-Link: Virtualization-Aware Networking," White Paper, Mar. 2009, 10 pages.

Cisco Systems, Inc., "Quick Start Guide, Cisco ACE 4700 Series Application Control Engine Appliance," Software Ve740rsion A5(1.0), Sep. 2011, 138 pages.

Cisco Systems, Inc., "Routing and Bridging Guide, Cisco ACE Application Control Engine," Software Version A5(1.0), Sep. 2011, 248 pages.

Cisco Systems, Inc.,"Vmware and Cisco VirtualizationSolution: Scale Virtual Machine Networking," Jul. 2009, 4 Pages.

Foundation for Intelligent Physical Agents, "FIPA Agent Message Transport Service Specification," Dec. 3, 2002, http://www.fipa.org; 15 pages.

* cited by examiner

DISCOVERY PROTOCOL FOR ENABLING AUTOMATIC BOOTSTRAP AND COMMUNICATION WITH A SERVICE APPLIANCE CONNECTED TO A NETWORK SWITCH

TECHNICAL FIELD

This disclosure relates in general to the field of communication and, more particularly, to a discovery protocol for enabling automatic bootstrapping of and communication with a service appliance connected to a switch in a network environment.

BACKGROUND

Data centers are increasingly used by enterprises for effective collaboration, data storage, and resource management. A typical data center network contains myriad network elements including servers, loudbalancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
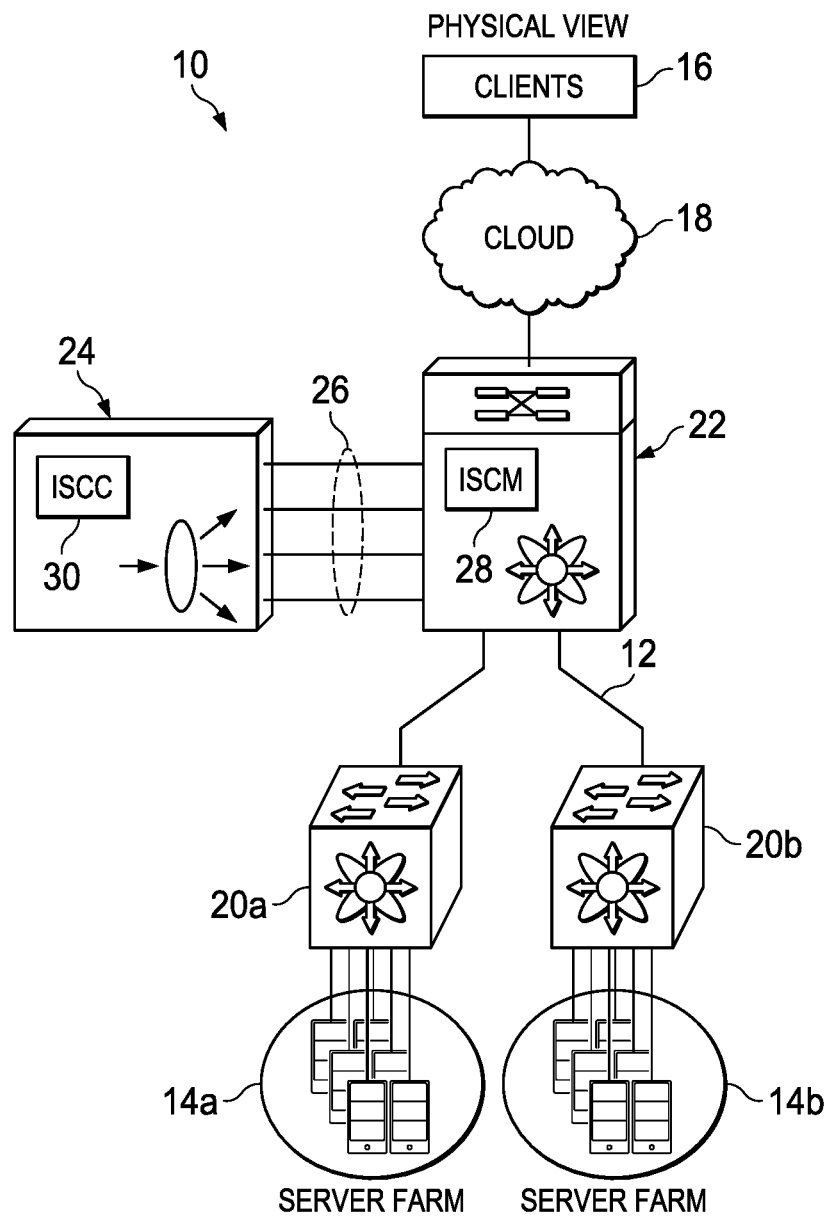
FIG. 1A is a simplified schematic diagram illustrating a physical view of a system for implementing a discovery protocol for enabling automatic bootstrapping of and communication with a service appliance connected to a switch in a network environment in accordance with an embodiment.

An example method is provided and includes configuring a service on a network element; associating a directly connected port with the service to create a port channel between the network element and a directly connected service appliance, the port channel comprising a plurality of member ports; performing an auto-discovery process for each of the member ports; and, upon successful completion of the auto-discovery process, indicating on the network element that the service appliance is operational. In certain embodiments, the network element includes an intelligent service card manager module ("ISCM") that forms part of a Remote Integrated Service Engine ("RISE") element with a corresponding intelligent service card client module ("ISCC") installed on the service appliance. The method may further include, upon unsuccessful completion of the auto-discovery process, repeating the auto-discovery process.

In some embodiments, the auto-discovery process includes sending a request message from the ISCM to a Layer 2 Platform Dependent ("L2PD") adapter disposed in the service appliance via the member port; reformatting the request message by the L2PD adapter and forwarding the reformatted request message to the ISCC; responding to the received reformatted request message by the ISCC and forwarding a response message to the L2PD adapter; and reformatting by the received response message by the L2PD and forwarding the reformatted response message to the ISCM via the member port. The auto-discover process may further include sending a BOOTSTRAP_4_APP message from the ISCC to an application implemented by the service appliance subsequent to receipt of the reformatted request message. The method may still further include forwarding configuration information from the L2PD to a configuration manager for enabling the configuration manager to configure the service appliance.

In certain embodiments, the network element is a switch. Performing the auto-discovery process may include executing a start message sequence; subsequent to completion of the start message sequence, executing a port discovery message sequence; subsequent to successful completion of the port message discover sequence, executing a discovery confirmation message sequence; and subsequent to successful completion of the discovery confirmation sequence, executing an end message sequence. Each of the message sequences may include sending a request message from the ISCM to a Layer 2 Platform Dependent ("L2PD") adapter disposed in the service appliance via the member port; reformatting the request message by the L2PD adapter and forwarding the reformatted request message to the ISCC; responding to the received reformatted request message by the ISCC and forwarding a response message to the L2PD adapter; and reformatting by the received response message by the L2PD and forwarding the reformatted response message to the ISCM via the member port. The discovery confirmation message sequence may include sending BOOTSTRAP_4_APP message from the ISCC to an application executing on the service appliance. Additionally, the end message sequence may include sending a configuration information message from the L2PD adapter to a configuration manager for configuring the service appliance.

Example Embodiments

Services appliances, such as load balancers, firewalls, Wide Area Application Services ("WAAS"), and file systems, deployed in a network do not have visibility into the networking aspects of switches and routers deployed therein. Similarly, network switches and routers lack visibility into the service appliances and the applications running on them. Additionally, network administrators and application administrators may be unaware of deployment and maintenance windows of one another, which may result in delays, decreased performance, and an increase in the time required to set up network devices. For example, when an image upgrade is scheduled on a switch, network administrator will need to manually relay the upgrade information to administrators of application-centric nodes (e.g., service appliances) in the network. When an application service is down, the network administrator may be forced to consult a variety of GUI tools, as well as the console of the switches/appliance to identify the problematic application and the network path to the application in order to debug and restore the network.

Network devices, like switches, lack the ability to configure service appliances directly connected to them based on capabilities provided by the appliances. This leads to operational inefficiency, long maintenance windows, and multiple upgrade and configuration requests being issued to different administrators of a network. Most configuration and discovery protocols, such as Link Aggregation Control Protocol ("LACP"), are static in nature and are unaware of characteristics of applications or services an application provides. As a result there is a suboptimal use of network resources and a lack of adaptability to change in the network.

Currently in data centers, there are many limitations to the manner in which data centers are managed. For example, a service appliance cannot enjoy the same benefit of a service module's simple configuration and operation. A standalone appliance has to be bootstrapped separately. Additionally, service appliances lack network function, which creates provisioning issues for the customer. Finally, managing and configuring multiple service appliances individually can be a time-consuming and error-prone process.

Turning to FIG. 1A, depicted therein is a simplified schematic diagram illustrating a physical view of a system 10 for implementing a discovery protocol for enabling automatic bootstrapping of and communication with a service appliance connected to a switch in a network environment in accordance with an embodiment. FIG. 1A includes a network (illustrated as multiple links 12) that connects one or more server farms 14a and 14b to one or more clients 16 via a cloud 18. Cloud 18 may encompass any public, semi-public, and/or private networks including enterprise networks, an Internet or intranet, community networks, etc. Individual servers in server farm 14a and 14b may communicate within the same farm via switches 20a and 20b, respectively. Servers in server farm 14a may communicate with servers in server farm 14b via a switch 22 in this particular example implementation.

A service appliance 24 may connect to switch 22 over a communication channel 26 (e.g., over a port-channel). As used herein, a "communication channel" encompasses a physical transmission medium (e.g., a wire), or a logical connection (e.g., a radio channel) used to convey information signals (e.g., data packets, control packets, etc.) from one or more senders (e.g., switch 22) to one or more receivers (e.g., service appliance 24). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 10, communication channel 26 may be a single channel: deployed for both control messages (i.e., messages that include control packets) and data messages (i.e., messages that include data packets).

As used herein, a "service appliance" is a discrete (and generally separate) hardware device with integrated software (e.g., firmware), designed to provide one or more network services including loadbalancing, firewall, intrusion prevention, virtual private network (VPN), proxy, etc. According to embodiments of the present disclosure, switch 22 may be configured with an intelligent service card manager module (ISCM) 28, and service appliance 24 may be configured with a corresponding intelligent service card client module (ISCC) 30. ISCM 28 and ISCC 30 can form part of a Remote Integrated Service Engine (RISE) infrastructure for implementing a discovery protocol for enabling automatic bootstrapping of and communication with a service appliance connected to a switch in a network environment, as will be described hereinbelow.

As described herein, RISE protocol enables a plug-and-play approach for registering appliance 24. Auto-discovery is a mechanism by which appliance 24 may be discovered by switch 22 (without any configuration on appliance) and registered as a service on switch 22. From the switch side, when a user has configured the RISE service on the switch, a RISE discovery packet ("RISE-DP") is sent using a multicast address. Appliance 24 is by default in RISE mode and all of its ports are all set in operation mode by default. When the RISE-DP is received by appliance 24, a response packet is sent to switch 22. A handshake can thereby be performed to establish bootstrap. As a result of bootstrap, an SUP IP of switch and an IP of appliance are made known to one another to enable ongoing control message communication.

The N7K switch allows more advanced configurations, such as configuring a VLAN group. The VLAN group is a list of trunk-allowed VLANS configured on the N7K. The list of VLANs is share with the appliance during discovery message exchange.

Auto-discovery and bootstrap may only be supported in directly attached mode. A "discovery channel" (described in greater detail below) is a TCP connection abstracted as a channel for enabling appliance discovery by the switch. It is used by the RISE protocol to exchange discovery messages, heartbeat messages, and system information discovery messages between ISCM 28 and ISCC 30.

Figure 1B:
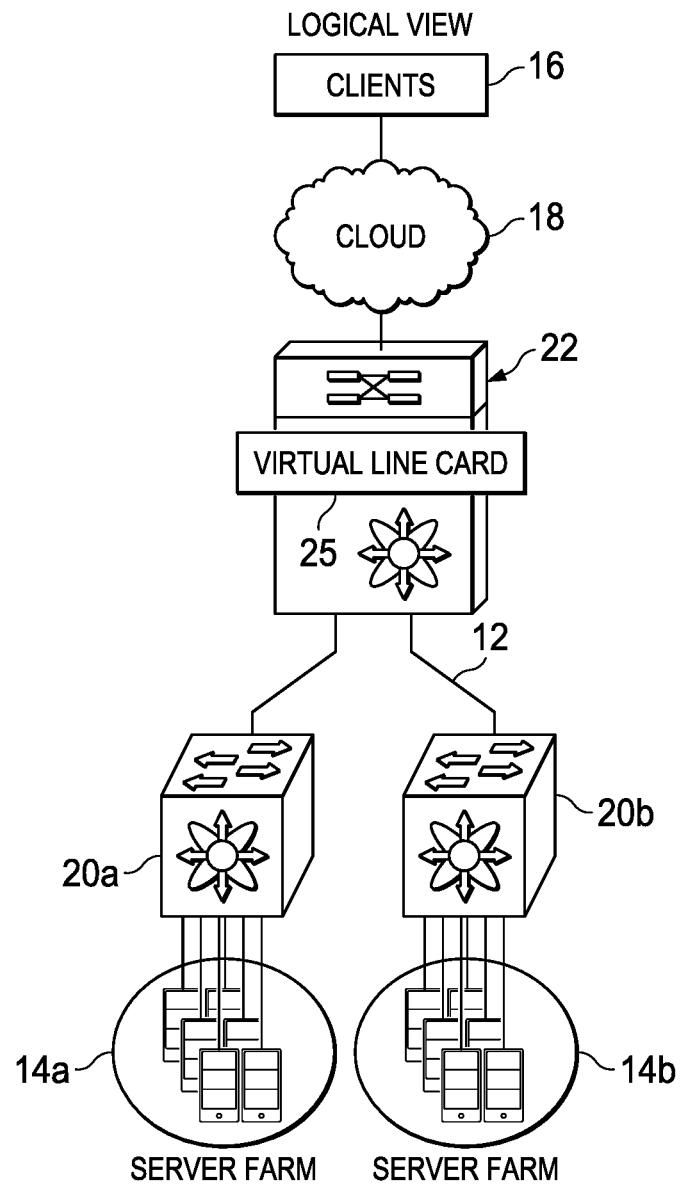
FIG. 1B is a simplified schematic diagram illustrating a logical view of the system of FIG. 1A in accordance with an embodiment.

Turning to FIG. 1B, FIG. 1B is a simplified schematic diagram illustrating a logical view of system 10. According to the embodiment illustrated in FIG. 1B, ISCC 30 and ISCM 28 may be configured to allow service appliance 24 to appear as a virtual line card 25. The terms "line card" and "service module" are interchangeably used herein to refer to modular electronic circuits interfacing with telecommunication lines (such as copper wires or optical fibers) and that offer a pathway to the rest of a telecommunications network. Hence, virtual line card 25 is interchangeable (in certain instances) with ISCM 28. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch, for example, on an appropriate slot. Virtual service modules are similarly configurable within a switch.

Note that the numerical and letter designations assigned to the elements of FIGS. 1A and 18 do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated in FIGS. 1A and 18. Any number of server farms and switches may be connected in the network without departing from the broad scope of the present disclosure.

For purposes of illustrating the techniques of system 10, it is important to understand the communications in a given system such as the system shown in FIGS. 1A and 18. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as loadbalancing, firewall, intrusion prevention, proxy, virtual private network (VPN), WAAS, file systems, etc., are provided through one or more of the following options: (1) service appliances that connect to network switches and routers; (2) specially designed high-performance routers configured with the services; or (3) network devices such as routers or switches that are configured with service modules that provide the services.

Typical service appliances integrate services such as loadbalancing, firewall, intrusion prevention, VPN, etc. in a single box format, which is generally based on modular, scalable platforms and which provides the most cost-effective option of the three options listed previously. Service appliances are typically connected externally to a switch (e.g., aggregate switch or access switch, etc.) either directly or indirectly via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Network services may also be provided by specially designed high-performance routers. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards are typically installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

However, each of these three options has certain drawbacks. For example, although option 1 (service appliances that provide the services and are physically separate from the switch or router) is the cheapest, it involves additional configuration operations that can be administratively challenging. In terms of the accompanying configuration issues, the network architecture can be typically divided into several plane, including: (i) network data plane, which performs various network data plane operations including framing, forwarding or switching, and transportation of data blocks to specific destinations; (ii) network control plane, which performs various network control plane operations including configuration, policy programming, logging, monitoring, and resource discovery; and (iii) application planes, including application control plane and application data plane that perform application functions for delivering and managing network services.

In general, the network data plane addresses the physical operations that are required to actually forward a packet to the next hop. For example, the network data plane can identify the set of data bearing transport resources; store the packet in memory while control plane information (such as the next hop address and egress interface) is determined; place the appropriate Layer 2 ("L2") addressing and encapsulation on the frame, and then forward the packet out the appropriate egress interface to the next hop. The network data plane can be responsible for ACLs, connection management, network address translation (NAT), loadbalancing, forwarding, etc.

In general, the network control plane deals with determining information for destination IP addresses in the network. The operations performed by the network control plane allow for the automation of higher-level network functions such as connection establishment, reconfiguration of signaled connections, connection restorations, etc. The network control plane may control the network data plane in real-time. Some functions may be embedded with elements of the network data plane, while other functions may be allocated to standalone control plane elements. The network control plane can be used to configure management traffic, syslogs, ARP, DHCP, etc. The network control plane is responsible for device management and control, configuration management (e.g., via command line interfaces (CLIs)), address resolution protocol (ARP), Access control list (ACL) compilation, etc.

In general, applications in the service appliance may send and receive data via the application data plane, for example, by opening software interfaces such as sockets that transmit and receive data over the network on behalf of the application. The application control plane may perform resource allocation, traffic engineering and performance optimization, among other functions, which may be specific to the application's network needs. For example, the application control plane may send control signals to start and stop transmission.

Service appliances are typically configured with network control plane, network data plane, and application planes. Service appliances usually communicate data plane messages with external network elements, whereas the control messages are internal within the service appliance. Packets sent from (and to) clients are routed through the service appliance and processed by applications in the service appliance before being forwarded to their intended destinations. Because service appliances perform network specific (L2/L3) control plane and data plane operations (in addition to application specific functions), any network specific configuration changes should be propagated to the service appliance.

For instance, loadbalancers are typically located near the end of solution delivery at data center server farms and, further, are generally managed by application/server administrators. Separately, the configurations on the switches, routers, etc. can be handled by network administrators. Loadbalancers have specific networking configurations like port-channel, virtual local area networks (VLANs), static IP routes, etc., and also loadbalancer specific configurations such as server farms, virtual-IP, servers, loadbalance policies, etc. Changes in the network configuration of the loadbalancer (or changes in network topology that could affect loadbalancer configurations) would require the application administrators and network administrators to work together to configure the loadbalancer appropriately, where these activities would engender administrative overhead and costs.

Moreover, service appliances may have to be compatible with particular features on the switches. The service appliance may have to support particular routing protocols, or be compatible with network features such as locator/identifier separation protocol (LISP), fabricpath, etc. that are supported by the switch. Further, when a service appliance is connected to a switch, the service appliance has to be configured separately for each virtual local area network ((VLAN), which is a logical division of a computer network within which information can be transmitted for all devices to receive) connected to the switch. In general, VLANs enable segmenting a switched network so that devices in one VLAN do not receive information packets from devices in another VLAN. If a separate VLAN that is provisioned for other client traffic is connected to the switch, then that VLAN has to be provisioned in the service appliance. Similarly, if any of the server side VLANs change, the change should be accounted for in the service appliance.

Options 2 and 3 (specially designed high-performance routers configured with the services, along with network devices configured with line cards that provide the service, respectively) are relatively expensive to develop for manufacturers (and expensive to buy from the customer perspective). They are also not as fast-to-market as the standard service appliances of option 1. Moreover, a user with a specially designed high-performance router may find that an upgrade to the network may involve upgrading the entire router. In addition, although upgrades may be relatively cheaper with line cards, the line cards themselves may have a limited (or fixed) feature set, and certain desired functionalities may be lacking compared to off-the-shelf standard service appliances. With all three options, it is difficult to mix and match services at a low cost (both investment and management costs) for a network topology that continues to change according to increasing demands on performance and efficiency.

System 10 is configured to address these issues (and others) in offering a handshake mechanism for offloading a service appliance feature to a switch in a network environment. According to embodiments of the present disclosure, service appliance 24 is connected to switch 22 directly via an L2 network. As will be described in detail below, a handshake mechanism is provided for enabling service appliance 24 to offload a feature to switch 22. In certain non-limiting embodiments, external service appliance 24 can be standard hardware that can be vendor agnostic, while being cheap and fast-to-market. Service module 24 may be configured as an in-chassis service module to seamlessly provide network services without additional configuration issues.

Turning to the potential infrastructure of FIGS. 1A and 1B, the example network environment may be configured as one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 10, including switches 22, 20a, and 20b, may include any type of network element connecting network segments. For example, switches 22, 20a, and 20b may include a multi-port network bridge that processes and routes data at a data link layer (L2). In another example, switches 22, 20a, and 20b may process data at a network layer (Layer 3 or "L3"), or Layer 4 (with network address translation and load distribution), or Layer 7 (load distribution based on application specific transactions), or at multiple layers (e.g., L2 and L3). In certain embodiments, functionalities of switches 22, 20a, and 20b may be integrated into other network devices such as gateways, routers, or servers. In various embodiments, switches 22, 20a, and 20b may be managed switches (e.g., managed using CLI, a web interface, etc.).

Communication channel 26 may include a port-channel, which can encompass an aggregation of multiple physical interfaces into one logical interface, for example, to provide higher aggregated bandwidth, loadbalancing and link redundancy. Communication channel 26 with multiple links can provide a high availability channel: if one link fails, traffic previously carried on this link can be switched to the remaining links. Communication channel 26 may contain up to 16 physical communication links and may span multiple modules for added high availability. In one embodiment, communication channel 26 can represent a port-channel with an aggregation of four point-to-point communication links over multiple ports. In another embodiment, communication channel 26 can represent a virtual port-channel (vPC).

Although FIGS. 1A and 1B show server farms 14a and 14b, it should be appreciated that system 10 is not limited to servers. In fact, any network element may be connected to the network via appropriate switches, where these implementations may be based on particular needs. As used herein, the term "network element" is meant to encompass computers, network appliances, servers, routers, switches, gateways, bridges, loadbalancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 14a and 14b may be replaced with LANs connecting desktop computers in a small office. In another example, server farms 14a and 14b may be replaced with a network of wireless communication devices. In yet another example, server farms 14a and 14b may be replaced with one or more supercomputers. Various other configurations and devices are contemplated within the broad framework of the present disclosure.

According to embodiments of the present disclosure, system 10 may provide for a fabric extender (FEX)-like protocol, discovery, message transport service (MTS)-like control messages, and defined messages between service appliance 24 and switch 22. A discovery protocol for enabling automatic bootstrapping of and communication with a service appliance connected to a switch in a network environment in accordance with an embodiment may be implemented as described hereinbelow.

In various embodiments, RISE (e.g., implemented as ISCC 30 in service appliance 24 and counterpart ISCM 28 in switch 22), can provide a plug-and-play approach to configure service appliance 24 as virtual line card 25. In an example embodiment, ISCM 28 may be implemented in a supervisor engine of switch 22. Note that communication channel 26 may be interchangeably referred to herein as a RISE channel, which is representative of one of the many types of channels that can be used in accordance with the teachings of the present disclosure. ISCC 30 and ISCM 28 may interact to provide communication channel 26 (i.e., RISE channel). In one embodiment, a default mode for service appliance 24 is set to RISE mode (e.g., ISCC 30 is active) and appliance ports are set in operation mode.

Figure 2:
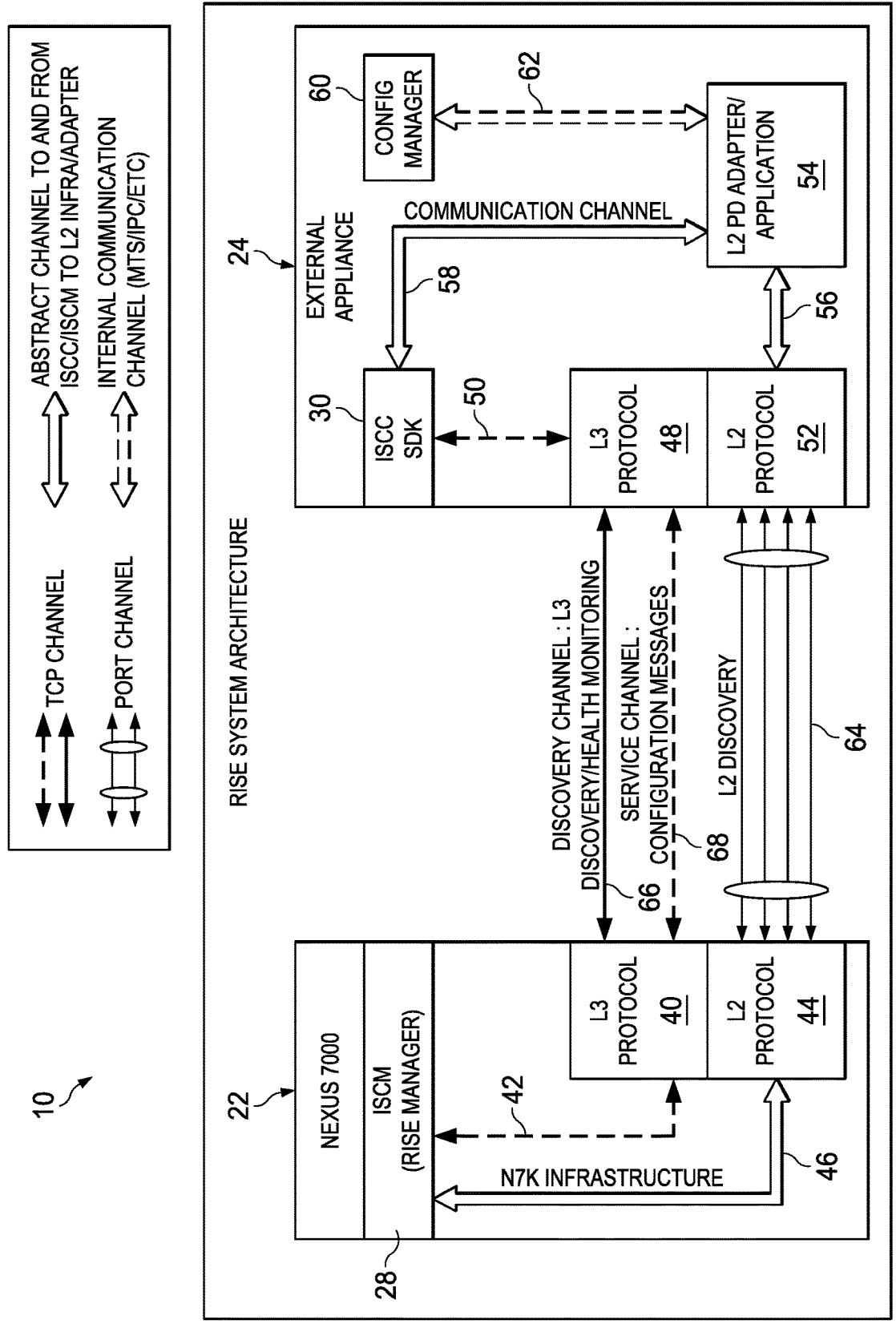
FIG. 2 is a simplified block diagram illustrating a details of the system of FIG. 1A in accordance with an embodiment.

A brand-new service appliance box is by default in RISE mode. The appliance need only be powered up and its ports connected to switch line card ports of the same type (e.g., M1, F2, F2). To configure the port channel and trunk allowed VLANs on a switch, the following commands may be used:
switch(config)# interface port-channel 1
switch(config-if)# switchport
switch(config-if)# switchport mode trunk
switch(config-if)# switchport trunk allowed vlan 20,30, 40,100
switch(config-if)# no shut To configure a RISE instance on the switch, the following commands may be used:
switch(config)# service vlan-group 1 20,30,40 [OPTIONAL]
switch(config)# service type rise ns1 mode direct
Note: assigned slot-id: 300
switch(config-rise)# vlan 100
switch(config-rise)# ip 100.0.0.250/24
switch(config-rise)# port-channel 1
switch(config-rise)# vlan group 1
switch(config-rise)# no shutdown Referring now to FIG. 2, illustrated therein is a more detailed block diagram of the system 10 shown in FIG. 1A. As shown in FIG. 2, switch 22 includes an L3 Protocol module 40, which is connected to ISCM 26 via a TCP channel 42, and an L2 Protocol module 44, which is connected to ISCM via an abstract channel 46. Service appliance 24 includes an L3 Protocol module 48 connected to ISCC 30 via a TCP channel 50 and an L2 Protocol module 52 connected to a Layer 2 Platform Dependent ("L2PD") RISE adapter/application 54 via an abstract channel 56. L2PD RISE adapter 54 is connected to ISCC 30 via an abstract channel 58 and to a configuration manager 60 via an internal communications channel (e.g., MTS, IPC, etc.) 62. In one embodiment L2PD RISE adapter 54 encompasses an application executed by service appliance 24 and may be referred to interchangeably as "L2PD RISE adapter/application."

A port channel 64 for L2 discovery is provided between L2 Protocol module 44 of switch 22 and L2 Protocol module 50 of service appliance 24. A discovery channel 66 is provided between L3 Protocol module 40 of switch 22 and L3 Protocol module 48 of service appliance 24. Discovery channel 66 is a TCP connection abstracted as a channel for enabling appliance discovery by switch 22. It is used by the RISE protocol to exchange discovery messages, heartbeat messages, and system information discovery messages between ISCM 28 and ISCC 30. A TCP service channel 68 is provided between L3 Protocol module 40 of switch 22 and L3 Protocol module 48 of service appliance 24. Service channel 68 is provided for communicating configuration messages.

Figure 3:
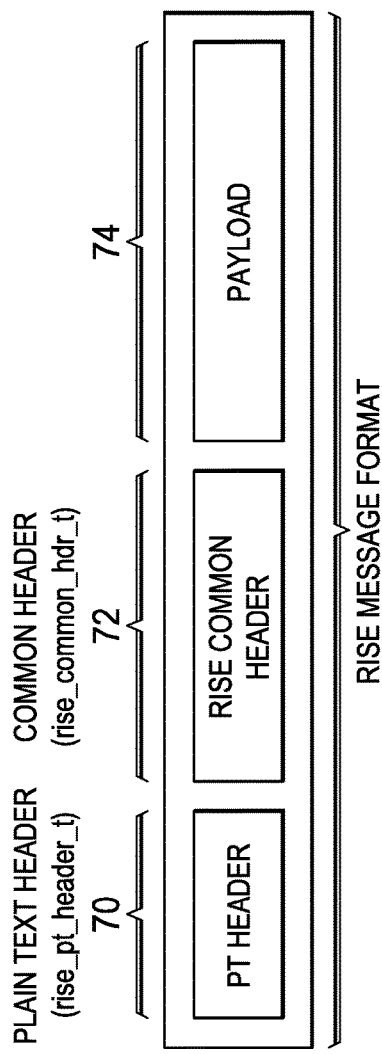
FIG. 3 illustrates a message format for use in implementing the discovery protocol for enabling automatic bootstrapping of and communication with a service appliance connected to a switch in a network environment in accordance with an embodiment.

In certain embodiments, ISCC 30 includes Platform Independent ("PI") and Platform Dependent ("PD") layers (collectively "PI/PD layers"). The PI layer is referred to herein as "RISE-SDK" and is responsible for communicating RISE protocol with ISCM 26. Additionally, RISE-SDK is responsible for performing TLV/deTLV, encryption/description, protocol version check, health monitoring, and other operations. RISE-SDK understands RISE messages of the format illustrated in FIG. 3, which comprises a plain text header (rise_pt_header_t) 70, a common header (rise_common_hdr_t) 72, and a payload 74.

Figure 4A:
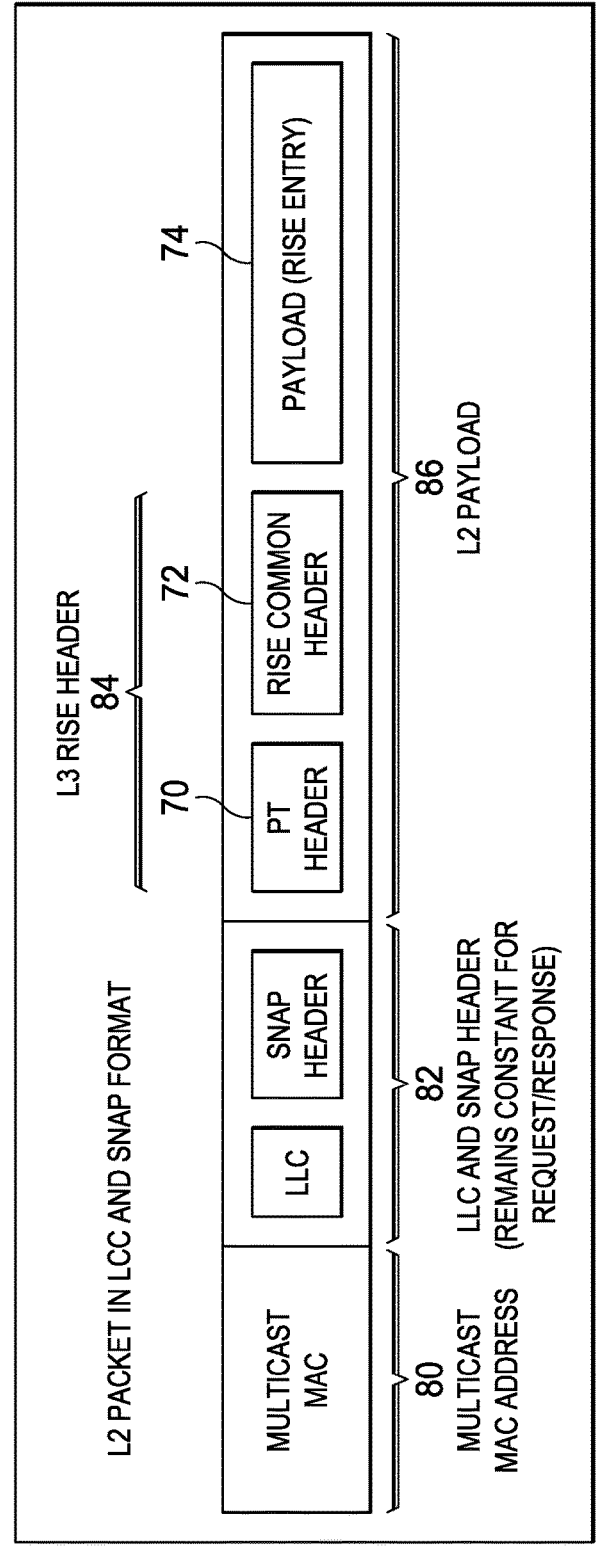
FIGS. 4A and 4B illustrate a message format for use in implementing the discovery protocol for enabling automatic bootstrapping of and communication with a service appliance connected to a switch in a network environment in accordance with an embodiment.
Figure 4B:
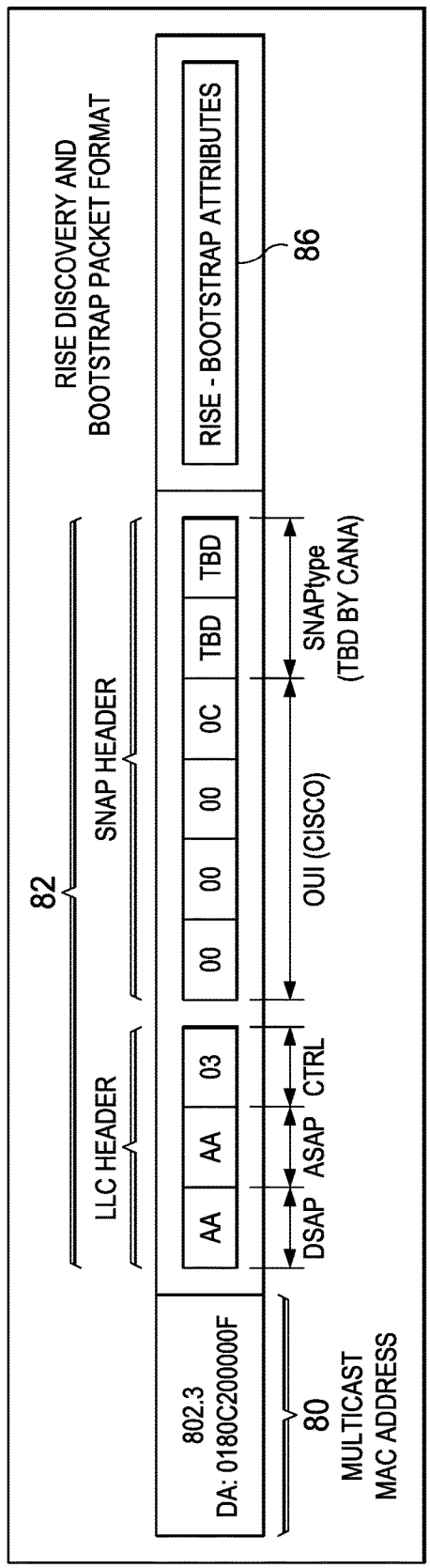

L2PD RISE adapter 54 is a platform-independent component on appliance 24 that is capable of reading L2 packets in an LLC+SNAP format, as illustrated in FIG. 4A. L2PD RISE adapter 54 communicates RISE L2 discovery messages with ISCC 30 via an application channel 58. Channel 58 is typically implemented as a UDP channel, but it may be any other type of communications channel as required by the implementation. L2PD RISE adapter is required only when direct attached mode/auto-discovery is supported by appliance 24. As illustrated in FIG. 4A, an L2 packet in LLC+ SNAP format includes a multicast address 80, an LLC and SNAP header (which remains constant for request and response) 82, an L3 RISE header 84 which includes plain text header 70 and RISE common header 72, and payload 74, which includes a RISE entry. L3 RISE header 84 and payload 74 are collectively an L2 payload 86. L2PD RISE adapter 54 is also responsible for configuring port channel 64 and related local configuration. The configuration is triggered based on an L2 discovery message with a specific opcode. It is important that L2PD adapter sends a response to a received L2 request message via the same physical port through which the request was received. In direct attach mode, the auto-discovery packet format is untagged in LLC+SNAP format as shown in FIG. 4B. The DA is a multicast address 0x01xxxxxxxxxx (to be reserved).

Embodiments described herein enable several features, including a per-port discovery and bootstrap mechanism for ports in a RISE port channel, L2 multicast handshake and message structure, and exchange of protocol messages on every port to discover the appliance directly attached to a switch via a RISE port channel. Additionally, embodiments enable failure handling for L2 discovery packets, and protocol behavior on port channel membership changes, member ports down, member ports up, and hardware failures on any port. In general, embodiments described herein enable a method to automatically discover and configure ports connected between a switch and a service appliance.

On the switch, the user configures a service and associates a directly connected logical or physical port the service. This is the RISE port channel. A process on the switch receives the above configuration information and triggers a RISE discovery packet ("RISE-DP"), which is sent in type/length/value ("TLV") format on each member port of the RISE port channel using a special multicast address reserved for RISE protocol (0x01xxxxxxxxxx). In certain embodiments, the switch is the initiator of the RISE protocol exchange and the appliance is the receiver. RISE-DP has the following message types (identified by opcode):
1. RISE_OPC_SVC_DIRECT_PORTS_START—serves as the marker for the start of discovery by the first port.
2. RISE OPC SVC DIRECT DISCOVERY—used to send confirmation to RISE SDK with initiator's information on a per-port basis; contains configuration parameters and instructs the appliance to configure the parameters on itself.
3. RISE_OPC_SVC_DIRECT_BOOTSTRAP_CONFIRM—used to provide bootstrap confirmation for each port.
4. RISE_OPC_SVC_DIRECT_BOOTSTRAP_4_APP—sent by RISE SDK to application when discovery is complete.
5. RISE_OPC_SVC_DIRECT_PORTS_END—serves as the marker for the end of discovery by the last port.

The payload of messages may include the following fields:
RISE name [type: string]
major version [type: string]
minor version [type: string]
slot number [type: integer]
virtual device context number [type: integer]
supervisor IP [type: IP address]
RISE IP [type: IP address]
RISE control VLAN [type: integer]
RISE state [enum: ACTIVE, INACTIVE]
RISE enabled [type: boolean]
RISE netmask [type: IP]
RISE vlan group [type: bitmap]
RISE vlan group number [type: integer]
RISE system information that is filled in response message:
  serial number [type: string]
  product name[type: string]
  model number [type: string]
  software version [type: string]
  hardware version [type: string]
  license information [type: string]

The appliance by default is set in RISE mode and the ports are operationally up by default. An access control list ("ACL") can be configured on the ports so they can put the multicast RISE packets to the RISE SDK.

Figure 5:
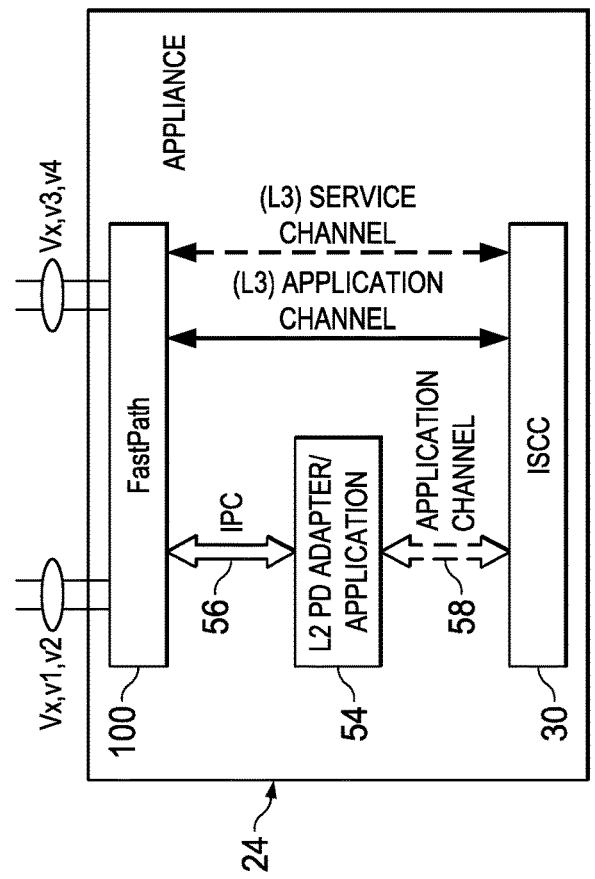
FIG. 5 is a simplified block diagram illustrating other details of the system of FIG. 2 in accordance with an embodiment.

FIG. 5 is a simplified block diagram of system 10 showing additional details of appliance 24 and operation thereof. In particular, upon receipt by appliance 24 of an L2 discovery-request packet from switch (not shown in FIG. 5), a FastPath module 100 will forward the packet to L2PD RISE adapter/application 54. L2PD RISE adapter converts the received packet into a RISE message by adding a RISE header to the front, and forwards it to ISCC 30 via the channel 58. ISCC 30 will process the received packet and send a RISE response message to L2PD RISE adapter 54 via channel 58. L2PD RISE adapter will convert the RISE response message to L2 LLC+SNAP packet format and forward it to switch. The LLC+SNAP header for discovery-response message is expected to be exactly same as that of the received L2 discovery-request packet except the message type is RISE_RESPONSE. It is mandatory to send the discovery-response packet to the switch via same physical port on which the corresponding discovery-request packet was received from the switch. Based on these received messages, it is the responsibility of L2PD RISE adapter 54 to perform local configuration on the appliance 24, such as ACL creation, adding CoPP policy, creating/adding a port to a port channel, setting management IP, etc.

Once all response packets are received by switch, switch will mark RISE L2 handshake complete. Switch will also send an end message to appliance 24 indicating L2 handshake is complete and ready for L3 communication. From this point on, ISCC 30 will use IPv4 TCP socket via FastPath 100 to communicate directly with ISCM at the SUP (ISCM). This process is further illustrated in FIG. 6, described in greater detail below.

Figure 6:
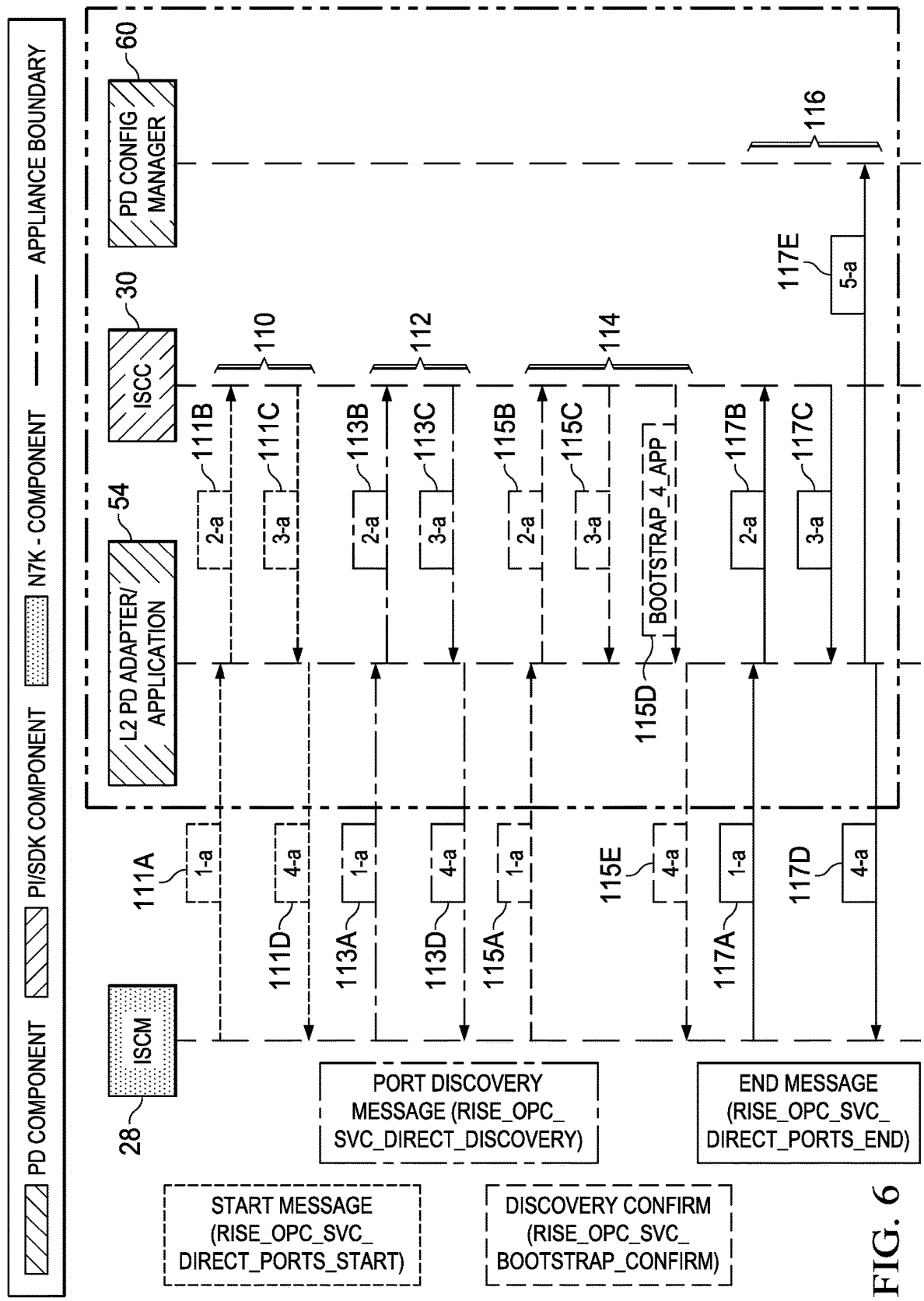
FIG. 6 is a flow diagram illustrating a discovery protocol for enabling automatic bootstrapping of and communication with a service appliance connected to a switch in a network environment in accordance with an embodiment.

An embodiment of the auto-discovery process described herein employs four RISE-DP message sequences. As a first step of each sequence, an L2 RISE (LLC+SNAP) packet is sent on each link of a port channel assigned to RISE service on the switch. The L2 RISE (LLC+SNAP) packet is read by the L2PD adapter and then forwarded to the ISCC in RISE message format via the application channel. The RISE message is processed by the ISCC and a response message is returned to the L2PD adapter via the application channel. Application/L2PD adapter is configured to convert RISE messages to L2 messages and return the L2 messages to the switch. The response message from the L2PD adapter should be sent via the same physical port through which the corresponding request message was received. For each of the four message sequences, the same steps described above will be repeated using different opcodes corresponding to the message sequence, as illustrated in FIG. 6. While exchanging L2 messages based on opcode, the L2PD adapter should perform local configuration, such as discarding stale port channel creation, adding security policies etc. The L2PD adapter may choose to schedule actions based on opcodes received at the L2PD adapter.

The recommended approach is to initiate auto-configuration of port channels and establish L3 connectivity using the RISE-IP when application receives the RISE_OPC_SVC_DIRECT_BOOTSTRAP_4_APP. This message can be considered an indication to the appliance that L2 SNAP discovery is complete. The payload of the message also provides the relevant information that the appliance needs to configure to bring up RISE service (e.g., RISE-IP, RISE VLAN, slot ID, etc.). After L2 discovery is complete, the switch will initiate the L3 discovery, so it is important to ensure that the TCP connectivity is established on the appliance. This means that RISE-IP and RISE VLAN have been configured on the RISE-enabled appliance as a result of successful L2 discovery.

FIG. 6 is a flow diagram illustrating various messages exchanged between ISCM 28, L2PD adapter/application 54, ISCC 30, and configuration manager 60. Each message is designated by <message_number>-<physical_port_id>; for example, message 1-a designates message #1 for a given opcode (or RISE-DP message sequence) sent on physical port a. As will be described, the same sequence is repeated for each port in the port-channel.

FIGS. 7A-7D illustrate the formats of the various RISE protocol messages (message 1-a, 2-a, 3-a, and 4-a) mentioned with reference to FIG. 6. Referring to FIG. 6, for the sake of example messages heading in the direction from ISCM 28 toward ISCC 30 may be referred to as "requests" and messages heading in the direction from ISCC 30 toward ISCM 28 may be referred to as "responses". A first step in the process illustrated in FIG. 6 comprises a RISE-DP START message sequence (opcode RISE_OPC_SVC_DIRECT_PORTS_START) 110. As shown in FIG. 6, a start request message 111A (in the format illustrated in FIG. 7A) is sent from ISCM 28 to L2PD adapter/application 54. The start request message 111A is then reformatted by L2PD adapter/application into the format illustrated in FIG. 7B and the reformatted start request message 111B is forwarded to ISCC 30. Upon receipt of the reformatted start request message 111B, ISCC 30 sends a start response message 111C in the format illustrated in FIG. 7C to L2PD adapter/application 54. Upon receipt of the start response message 111C, the L2PD adapter/application reformats the message in the format illustrated in FIG. 7D and forwards a reformatted response message 111D to ISCM 28. Message 111D marks the end of the RISE-DP START message sequence 110.

Figure 7A:
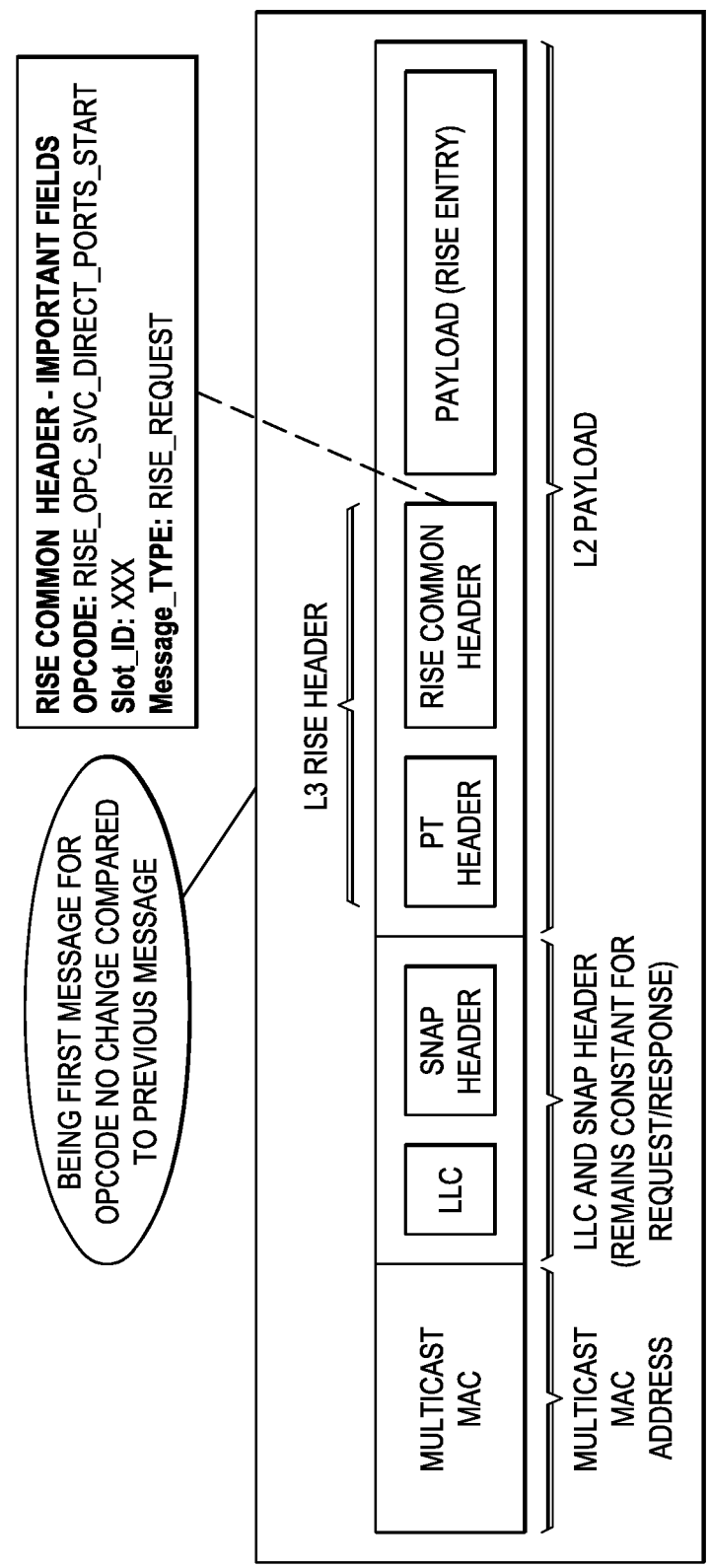
FIGS. 7A-7D illustrate message formats associated with the discovery protocol as illustrated in FIG. 6.
Figure 7B:
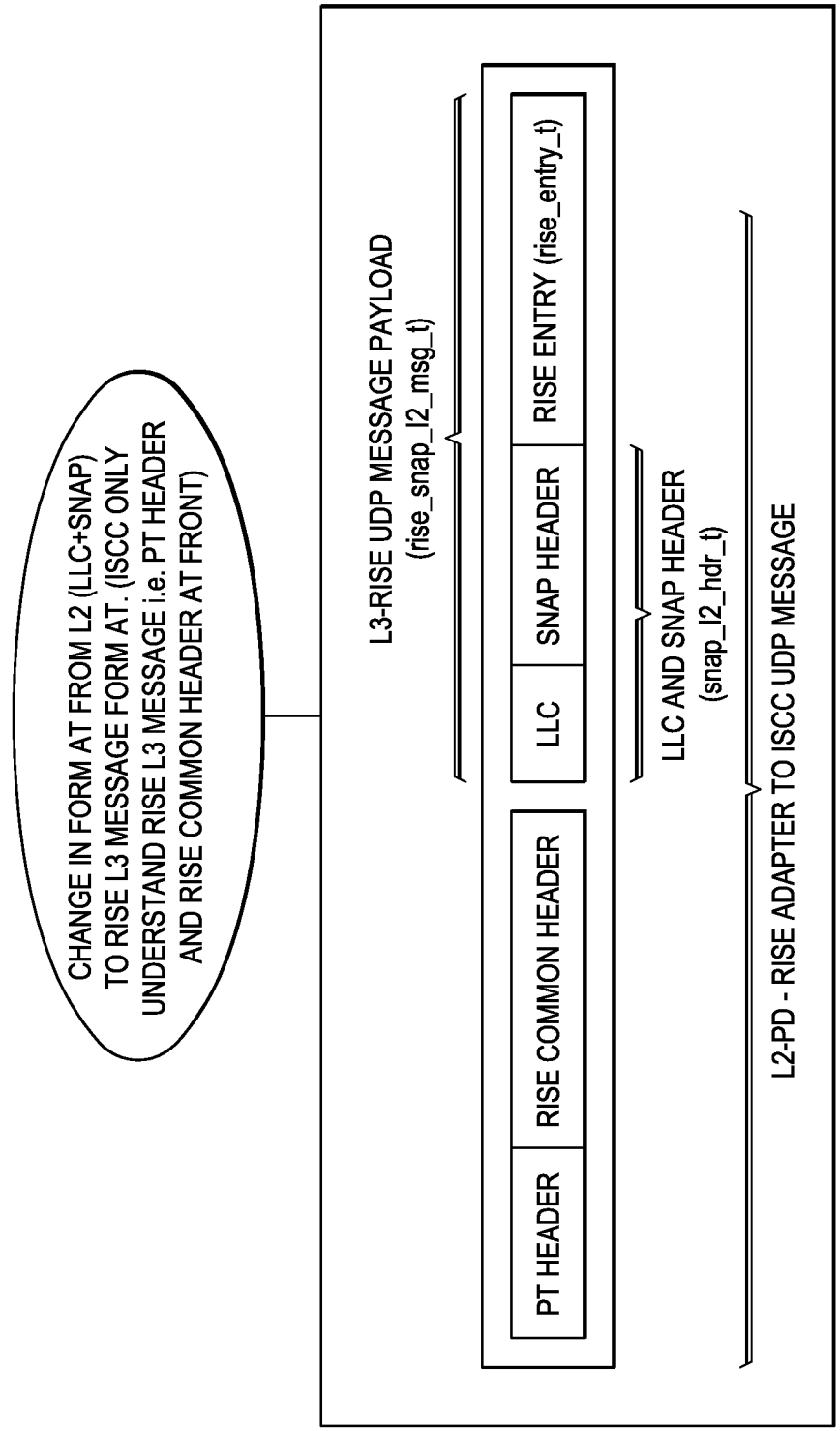
Figure 7C:
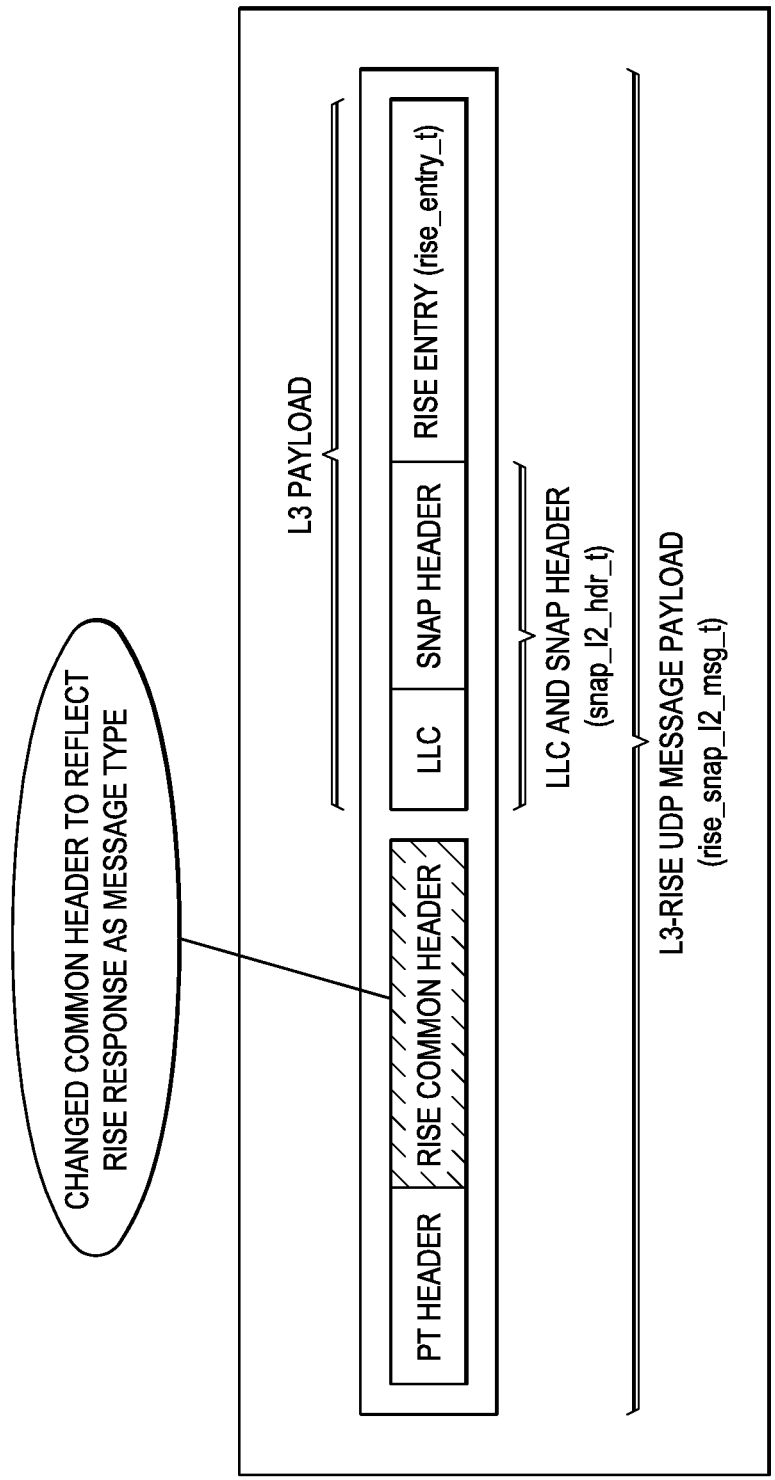
Figure 7D:
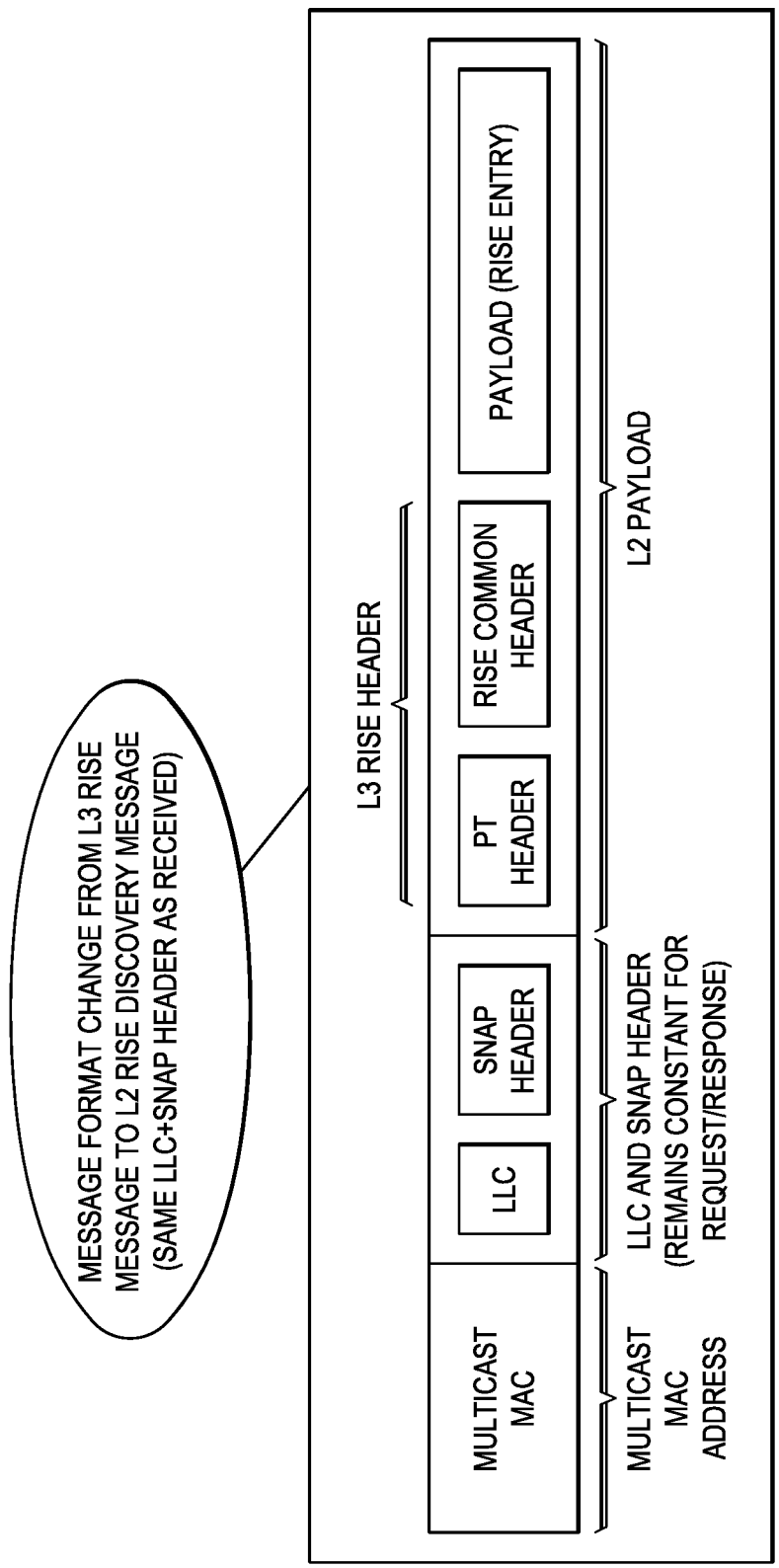

Upon completion of the START message sequence 110, a RISE-DP PORT DISCOVERY message sequence (opcode RISE_OPC_SVC_DIRECT_DISCOVERY) 112 begins with a port discovery request message 113A, in the format illustrated in FIG. 7A, sent from ISCM 28 to L2PD adapter/application 54. The port discovery request message 113A is then reformatted by L2PD adapter/application 54 into the format illustrated in FIG. 7B and the reformatted port discovery request message 113B is forwarded to ISCC 30. Upon receipt of the reformatted port discovery request message 113B, ISCC 30 sends a port discovery response message 113C in the format illustrated in FIG. 7C, to L2PD adapter/application 54. Upon receipt of the port discovery response message 113C, L2PD adapter/application 54 reformats the message in the format illustrated in FIG. 7D and forwards a reformatted response message 113D to ISCM 28. Message 113D is the end of the PORT DISCOVERY message sequence 112.

Upon completion of the PORT DISCOVERY message sequence 112, a RISE-DP DISCOVERY CONFIRMATION message sequence 114 (opcode RISE_OPC_SVC_BOOTSTRAP_CONFIRM) begins with a discovery confirmation request message 115A, in the format illustrated in FIG. 7A, sent from ISCM 28 to L2PD adapter/application 54. The discovery confirmation request message 115A is then reformatted by L2PD adapter/application 54 into the format illustrated in FIG. 7B and the reformatted discovery confirmation request message 115B is forwarded to ISCC 30. Upon receipt of the reformatted discovery confirmation request message 11513, ISCC 30 sends a discovery confirmation response message 115C in the format illustrated in FIG. 7C, to L2PD adapter/application 54. Additionally, a BOOTSTRAP_4_APP message 115D is forwarded from ISCC 30 to application portion of the L2PD adapter/application 54 to indicate to the application that L2 discovery is complete. Upon receipt of the discovery confirmation response message 115C, L2PD adapter/application 54 reformats the message in the format illustrated in FIG. 7D and forwards a reformatted response message 115E to ISCM 28. Message 115E is the end of the discovery confirmation sequence 114.

Upon completion of the DISCOVERY CONFIRMATION message sequence 114, a RISE-DP END MESSAGE message sequence (opcode RISE_OPC_SVC_DIRECT_PORTS_END) 116 begins with an end message request message 117A, in the format illustrated in FIG. 7A, sent from ISCM 28 to L2PD adapter/application 54. The end message request message 117A is then reformatted by L2PD adapter/application 54 into the format illustrated in FIG. 7B and the reformatted end message request message 117B is forwarded to ISCC 30. Upon receipt of the reformatted end message request message 11713, ISCC 30 sends an end message response message 117C in the format illustrated in FIG. 7C, to L2PD adapter/application 54. Upon receipt of the end message response message 117C, L2PD adapter/application 54 reformats the message in the format illustrated in FIG. 7D and forwards a reformatted response message 117D to ISCC 28. L2PD adapter/application 54 also forwards a message 117E to configuration manager 60. The payload of message 117E includes relevant information that appliance needs for configuration, which is performed by configuration manager 60 subsequent to receipt of message 60. Message 117D is the end of the END MESSAGE message sequence 116.

The packets carried between ISCM 28 and ISCC 30 during the process illustrated in FIG. 6 carry the same payload data structure:

```
typedef struct rise_pt_hdr {
    u_int16_t major_version;
    u_int16_t minor_version;
    u_int32_t length ;// length of payload
}rise_pt_header_t;
```

```
typedef struct rise_common_hdr {
    u_int32_t opcode; // defines in rise.h ( message opcode)
    rise_slot_id_t slot_id;// slot id assigned after bootstrap, 0 for bootstrap messages
    u_int32_t vdc_id;
    u_int32_t rrtoken; // token used to match request with response
    u_int32_t message_type; // 0 request 1 response
    u_int32_t num_entries; // set as 1 for non bulk message op codes
    u_int32_t g_token; // Global counter maintained for No-Service/Service/No-Service interleaving.
    u_int32_t reserved; // future use
} rise_common_hdr_t;
typedef struct rise_entry_ {
    char name[RISE_NAME_MAX]; // Name of service on Nexus switch
    char device_id[RISE_DEVICE_ID_MAX]; // Unique Device ID of nexus switch
    rise_pkt_stats_t pkt_stats[NUM_RISE_OPCODES]; // Packet Stats info
    u_int16_t major_ver; // RISE Protocol Major Version
    u_int16_t minor_ver; // RISE Protocol Minor Version
    rise_slot_id_t slot_id; // Service Slot id - assigned by Nexus during service creation
    u_int16_t vdc_id; // VDC identifier of VDC to which RISE service belongs to on Nexus switch
    u_int32_t sup_ip; // Nexus Sup Management IP
    u_int32_t rise_ip; // Appliance Management IP, through with Nexus communicate in indirect mode
    u_int16_t vlan; // Vlan configured used for Nexus to appliance communication
    u_int32_t vlan_grp; // Group of VLAN configured during service creation, if any
    rise_connect_mode_t connect_mode; // RISE Service Mode (Direct/Indirect)
    u_int32_t enabled; // Flag indicating is service enabled
    rise_op_state_t op_state; // Current Start of Service
    u_int8_t vlan_bitmap[512];
    u_int32_t inactive_reason; // Flag indicating reason when service inactive
    u_int32_t g_token; // Global counter maintained for No-Service/Service/No-Service interleaving.
} rise_entry_t;
```

L2PD adapter/application is expected to have a port-channel and slot-id mapping. While converting an L2 SNAP message to a RISE message before forwarding it to ISCC, it is advisable to send the message payload confirming 'C' structure 'snap_12_hdr_t'. This will simplify application implementation by not requiring retention of the L2 SNAP header. Also, L2PD adapter may leverage appended data after as part of payload so that it can retain (as part of the message itself) the physical port number on which the L2 packet was received. When ISCC sends a BOOTSTRAP_4_APP packet (115D, FIG. 6), application may use the slot-id to determine to which port-channel the newly discovered port should be added.

Discovery of each port occurs independently of discovery of other ports. The only information communicated to application, if a given port corresponds to a port channel, is the slot-id. As a result, it is crucial for the application to maintain a slot-id-to-port-channel mapping. When a BOOTSTRAP_4_APP packet received by application, the application will determine whether the slot-id is new. If the slot-id is new, a port-channel will be created. The if_index from received response message from ISCC will designate which port will join the port channel. The management VLAN and its VLAN interface and policy must be created when the new slot-id arrives. TCP connectivity is then established. The bootstrap-4-app packet for all other ports from L2 handshake will arrive subsequently. If the slot-id exists in application, then the port should be just added into the existing port-channel.

Figure 8:
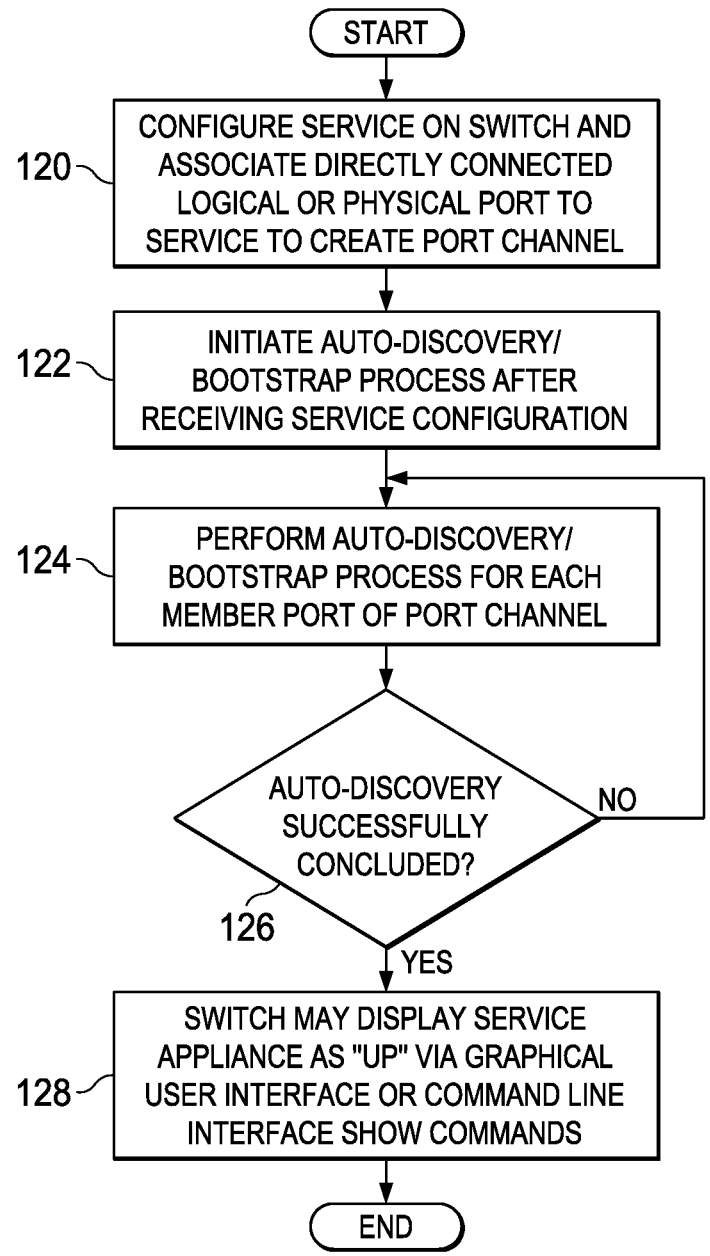
FIG. 8 is a flowchart illustrating additional details of operation of a discovery protocol for enabling automatic bootstrapping of and communication with a service appliance connected to a switch in a network environment in accordance with an embodiment.

FIG. 8 is a flowchart illustrating operation of an embodiment for implementing an auto-discovery/bootstrap process in accordance with features described herein. In step 120, a user configures a service on the switch and associates a directly connected logical or physical port to the service. This creates the RISE port channel. In step 122, a process on the switch receives the configuration information and initiates, or triggers, the auto-discovery/bootstrap process. In particular, a RISE-DP packet is sent in TLV format on each member of the RISE port channel using a special multicast address reserved for RISE protocol. In step 124, auto-discovery/bootstrap is performed for each member port of the RISE port channel as described with reference to FIG. 6. In step 126, upon conclusion of the auto-discovery/bootstrap process, a determination is made whether the process concluded successfully. If not, execution returns to step 124 and the process is reexecuted. If the process did conclude successfully, execution proceeds to step 128, in which the switch may display the service appliance as "UP" via graphical user interface ("GUI") or command line interface ("CLI") show commands. At this point, the switch has knowledge of the capabilities of the appliance and vice versa. No configuration needs to be performed on the service appliance. The RISE SDK running on the appliance should support the L2 protocol described herein.

Returning to step 126, auto-discovery is successfully completed by the switch until all of the physical ports that are in state "UP" on the port channel acknowledge the RISE-DP messages. Some of the failures that may be handled by a failure detection mechanism of certain embodiments include no reply from the service appliance, changes in the port membership of the port channel, port members in the port channel changing state (i.e., transitioning up or down), hardware errors on ports and/or interfaces, management traffic failures, and line card bring up/down event handling.

Figure 9:
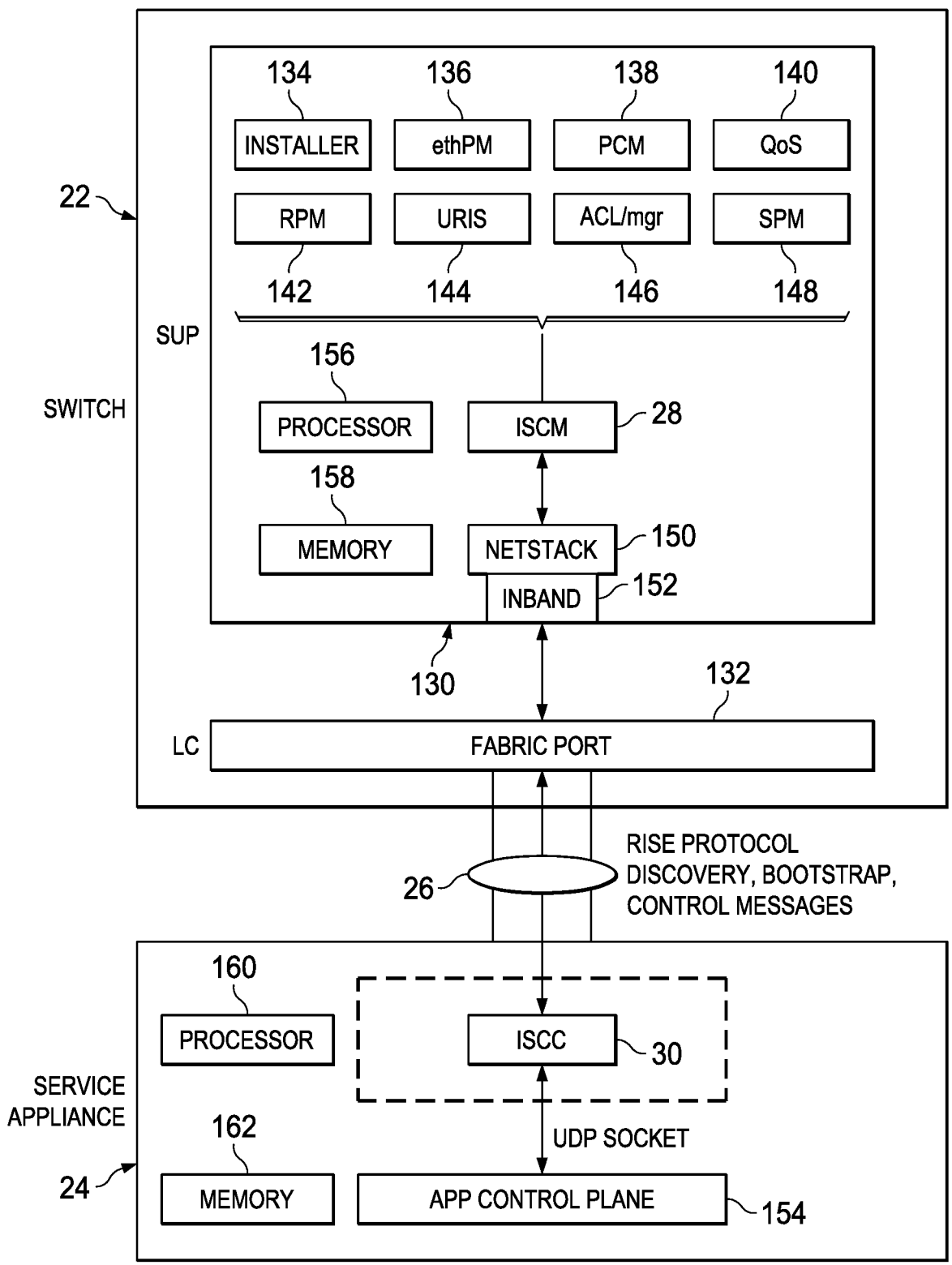
FIG. 9 is a simplified block diagram illustrating other details of the system in accordance with one embodiment.

Turning to FIG. 9, FIG. 9 is a simplified block diagram illustrating example details of system 10 according to embodiments of the present disclosure. A supervisor engine 130 on switch 22 may communicate with service appliance 24 via a line card including a fabric port 132 that connects directly via channels 58A and 58B to a node on service appliance 24. Supervisor engine 130 may include several modules such as an installer 134, an Ethernet port manager (ethPM) 136, a port-channel manager (PCM) 138, a Quality of Service (QoS) element 140, a route policy manager (RPM) 142, a unified routing information base (URIB) 144, an access control list manager (ACLmgr) 146, and a service policy manager (SPM) 148 for performing various routing and/or management functions. ISCM 28 may be provisioned in supervisor engine 130 to provide RISE-related functionality in accordance with features described herein. ISCM 28 may manage one or more service modules, including in-chassis service modules and remote service modules.

A Netstack module 150 may be provisioned in supervisor engine 130 for implementing TCP/IP stack for received frames hitting the control-plane of supervisor engine 130. Supervisor engine 130 may be configured with an inband port 152, which may be a virtual port that provides an interface for management traffic (such as discovery) to a management processor such as a processor 156.

According to various embodiments, ISCM 28 may offer various functionalities such as handling (i.e., accommodating, managing, processing, etc.) RISE messages (in the format illustrated in FIGS. 4A and 4B), high availability activities, timer events, Persistent Storage Service ("PSS"), American Standard Code for Information Interchange ("ASCII") generation, logging, event handling, health monitoring, debugging, etc. ISCM 28 may be a finite state machine utility ("FSMU") based application (e.g., which indicates an abstract machine that can be in one of a finite number of states). In various embodiments, ISCM 28 may have a well-defined MTS seamless authentication protocol ("MTS SAP") assigned and it can open a socket-based MTS queue and bind to the well-defined SAP such that other processes may communicate with it.

In various embodiments, ISCM 28 may also maintain an array of MTS operation code ("opcode"), which can define how to process a received MTS message. The array may include per-opcode specific MTS flags, handler functions, etc. ISCM 28 may be configured to receive CLI driven MTS messages, MTS notifications (such as event driven messages indicating, for example, that a particular VLAN is up or down), and MTS request/responses. In various embodiments, ISCM 28 may be configured so that MTS-based communication with other processes may be non-blocking and asynchronous. Thus, ISCM 28 may handle multiple events (which can arrive at any time) for the same resource such that the state of the resource is consistent (and not compromised).

Subsequent to ports being configured in RISE mode, discovery and bootstrap may be performed by ISCM 28 and ISCC 30 to establish an appropriate control channel. After the control channel is established, applications in service appliance 52 may send control messages (e.g., using the UDP socket interface) to ISCC 30 through an application control plane 154. Application control plane 154 generally encompasses one or more software components for performing workflow management, self-management, and other application control layer processes. Supervisor 130 may be provisioned with (or have access to) processor 156 and a memory 158 for performing its various functions. ISCM 28 may use processor 156 and memory 158 to perform RISE related functions in switch 22. Similarly, service appliance 24 may be provisioned with (or have access to) a processor 160 and a memory 162. ISCC 30 may use processor 160 and memory 162 to perform RISE related functions in service appliance 24.

The embodiments described herein include a protocol for automatic discovery and dynamic configuration of physical ports, interfaces, and limited network configuration on a service appliance. The protocol has a built-in failure handling mechanism that enables the switch to automatically discover and configure appliance ports without manual intervention.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliances 24, 42, and/or switches 22, 44 (e.g., through various modules, algorithms, processes, etc.). In some embodiments, one or more of these features may be implemented in hardware, provided external to these elements, or consolidated in any appropriate manner to achieve the intended functionality. Service appliances 24, 42, and/or switches 22, 44, may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switches 22, 44, and service appliances 24, 42, described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 162, memory 158) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 156 and processor 160 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 and/or system 40 can include one or more memory elements (e.g., memory 158, memory 162) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 and/or system 40 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 10 and/or system 40 may be applicable to other exchanges, formats, or routing protocols. Moreover, although systems 10 and 40 have been illustrated with reference to particular elements and operations that facilitate the communication process, these elements, and operations may be replaced by any suitable architecture or process that achieves the intended functionality of systems 10 and 40.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method, comprising:
    creating a port channel between a network element and a directly connected service appliance, the port channel comprising a plurality of member ports;
    performing an auto-discovery process for each of the member ports, comprising:
        sending a request message from an intelligent service card manager module ("ISCM") to a Layer 2 Platform Dependent ("L2PD") adapter disposed in the service appliance via the member port;
        reformatting the request message by the L2PD adapter and forwarding the reformatted request message to a corresponding intelligent service card client module ("ISCC") installed on the service appliance;
        responding to the received reformatted request message by the ISCC and forwarding a response message to the L2PD adapter; and
        reformatting the received response message by the L2PD adaptor and forwarding the reformatted response message to the ISCM via the member port; and
        sending a BOOTSTRAP_4-APP message from the ISCC to an application implemented by the service appliance subsequent to receipt of the reformatted request message;
    upon successful completion of the performing, indicating on the network element that the service appliance is operational and automatically configuring the service appliance as a virtual line card on a switch.

2. The method of claim 1, further comprising:
    upon successful completion of the auto-discovery process, repeating the auto-discovery process.

3. The method of claim 1, further comprising forwarding configuration information from the L2PD to a configuration manager for enabling the configuration manager to configure the service appliance.

4. The method of claim 1, wherein the network element is a switch.

5. The method of claim 1, wherein the performing the auto-discovery process further comprises:
    executing a start message sequence;
    subsequent to completion of the start message sequence, executing a port discovery message sequence; and
    subsequent to successful completion of the port message discovery message sequence, executing a discovery confirmation message sequence.

6. The method of claim 5, wherein the performing the auto-discovery process further comprises:
    subsequent to successful completion of the discovery confirmation message sequence, executing an end message sequence.

7. The method of claim 6, wherein the end message sequence includes sending a configuration information message from the L2PD adapter to a configuration manager for configuring the service appliance.

8. An apparatus, comprising:
    a memory for storing data; and
    a processor operable to execute instructions associated with the data, wherein the processor and the memory cooperate to perform operations comprising:

performing an auto-discovery process for each of a plurality of member ports, comprising:
sending a request message from an intelligent service card manager module ("ISCM") to a Layer 2 Platform Dependent ("L2PD") adapter disposed in a service appliance via the member port;
reformatting the request message by the L2PD adapter and forwarding the reformatted request message to a corresponding intelligent service card client module ("ISCC") installed on the service appliance;
responding to the received reformatted request message by the ISCC and forwarding a response message to the L2PD adapter; and
reformatting the received response message by the L2PD adaptor and forwarding the reformatted response message to the ISCM via the member port; and
sending a BOOTSTRAP_4-APP message from the ISCC to an application implemented by the service appliance subsequent to receipt of the reformatted request message;
upon successful completion of the performing, indicating on a network element that the service appliance is operational and automatically configuring the service appliance as a virtual line card on a switch.

9. The apparatus of claim 8, further comprising:
upon successful completion of the auto-discovery process, repeating the auto-discovery process.

10. The apparatus of claim 8, further comprising forwarding configuration information from the L2PD to a configuration manager for enabling the configuration manager to configure the service appliance.

11. The apparatus of claim 8, wherein the network element is a switch.

12. The apparatus of claim 8, wherein the performing the auto-discovery process further comprises:
executing a start message sequence;
subsequent to completion of the start message sequence, executing a port discovery message sequence; and
subsequent to successful completion of the port message discovery message sequence, executing a discovery confirmation message sequence.

13. The apparatus of claim 12, wherein the performing the auto-discovery process further comprises:
subsequent to successful completion of the discovery confirmation message sequence, executing an end message sequence.

14. The apparatus of claim 13, wherein the end message sequence includes sending a configuration information message from the L2PD adapter to a configuration manager for configuring the service appliance.

15. A non-transitory tangible media having encoded thereon logic that includes instructions for execution and when executed by a processor operable to perform operations comprising:
creating a port channel between a network element and a directly connected service appliance, the port channel comprising a plurality of member ports;
performing an auto-discovery process for each of the member ports, comprising:
sending a request message from an intelligent service card manager module ("ISCM") to a Layer 2 Platform Dependent ("L2PD") adapter disposed in the service appliance via the member port;
reformatting the request message by the L2PD adapter and forwarding the reformatted request message to a corresponding intelligent service card client module ("ISCC") installed on the service appliance;
responding to the received reformatted request message by the ISCC and forwarding a response message to the L2PD adapter; and
reformatting the received response message by the L2PD adaptor and forwarding the reformatted response message to the ISCM via the member port; and
sending a BOOTSTRAP_4-APP message from the ISCC to an application implemented by the service appliance subsequent to receipt of the reformatted request message;
upon successful completion of the performing, indicating on the network element that the service appliance is operational and automatically configuring the service appliance as a virtual line card on a switch.

16. The media of claim 15, further comprising:
upon successful completion of the auto-discovery process, repeating the auto-discovery process.

17. The media of claim 15, further comprising forwarding configuration information from the L2PD to a configuration manager for enabling the configuration manager to configure the service appliance.

18. The media of claim 15, wherein the network element is a switch.

19. The media of claim 15, wherein the performing the auto-discovery process further comprises:
executing a start message sequence;
subsequent to completion of the start message sequence, executing a port discovery message sequence;
subsequent to successful completion of the port message discovery message sequence, executing a discovery confirmation message sequence; and
subsequent to successful completion of the discovery confirmation message sequence, executing an end message sequence.

20. The media of claim 19, wherein the end message sequence includes sending a configuration information message from the L2PD adapter to a configuration manager for configuring the service appliance.

* * * * *